(No Model.)
C. M. PECK.
TRICK PLATFORM FOR BICYCLE RIDERS.
No. 564,392. Patented July 21, 1896.
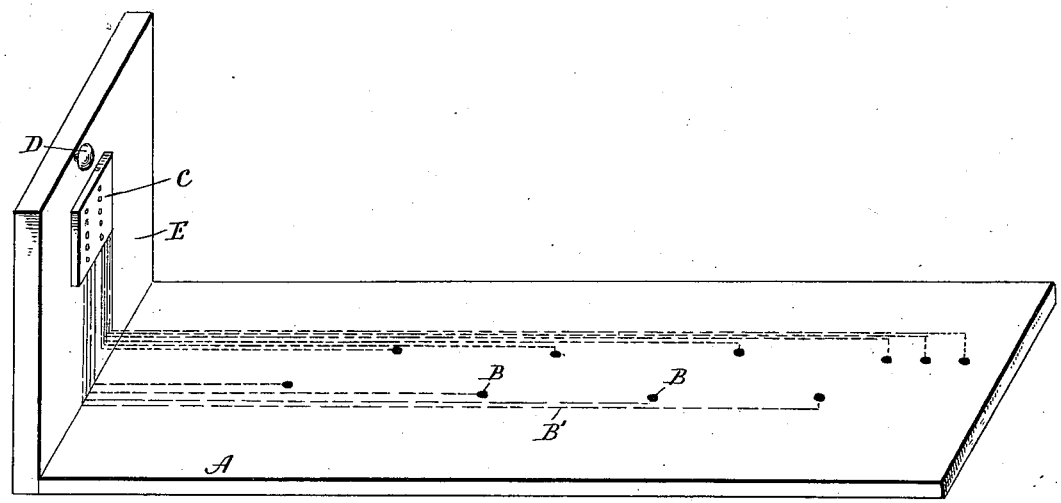

UNITED STATES PATENT OFFICE.

CHARLES M. PECK, OF NEW HAVEN, CONNECTICUT.

TRICK-PLATFORM FOR BICYCLE-RIDERS.

SPECIFICATION forming part of Letters Patent No. 564,392, dated July 21, 1896.

Application filed May 11, 1896. Serial No. 590,970. (No model.)

*To all whom it may concern:*

Be it known that I, CHARLES M. PECK, of New Haven, in the county of New Haven and State of Connecticut, have invented a new Improvement in Trick-Platforms for Bicycle-Riders; and I do hereby declare the following, when taken in connection with the accompanying drawing and the letters of reference marked thereon, to be a full, clear, and exact description of the same, and which said drawing constitutes part of the specification, and represents a perspective view of one form which a trick-platform containing my invention may assume.

My invention relates to an improvement in trick-platforms for bicycle-riders, the object being to produce a simple and convenient apparatus for testing the relative skill of riders.

With these ends in view, my invention consists in the combination, with a platform, of a series of circuit-changers arranged therein in position to be operated by the passage of a bicycle-wheel over them, an indicator, and connection between the said changers and indicator, whereby their operation by a wheel is evidenced.

My invention further consists in a trick-platform having certain details of construction and combinations of parts, as will be hereinafter described, and pointed out in the claims.

While it is apparent that my apparatus may assume a great variety of forms, I have chosen to illustrate my invention by means of a very simple embodiment of it.

As herein shown, I employ a simple oblong rectangular platform A, in which a plurality of circuit-changers B are located so as to be engaged with and operated by a bicycle ridden upon the platform, in which, as shown, the circuit-changers are arranged out of line, or dodged, so that to make contact with them all the bicycle-rider must, in riding the length of the platform, have perfect command over his wheel and operate it with great skill. The said circuit-changers, which may be push-buttons or circuit-changers of any suitable construction, are connected by means of electric wires B' with a visual indicator C and a bell D, both of which are mounted in a vertically-arranged frame E, located at one end of the platform. It will be understood, of course, that the apparatus is provided with a battery located in the circuit of the electric connections B', but not shown.

The indicator C may be of any approved construction, and indicate by the dropping of flaps, by the movement of pointers, or in any other way that the circuit-changers B have been operated. The bell D will preferably be arranged to ring every time a circuit-changer is operated. I may dispense either with the visual indicator or bell, or vice versa, my invention comprehending, broadly, electrically-operated means whereby the operation of the circuit-changers in the platform is made known. Thus, after a rider has ridden the length of the platform, the visual indicator will indicate just how many of the circuit-changers he has succeeded in operating in riding over it, while as he rides the bell will respond and ring immediately upon his making contact with a button, the indicator giving him a permanent record, so to speak, when he has ridden the length of the platform, and the bell informing him and the bystanders of the character of the score that he is making as he goes along.

It is apparent that the platform is susceptible of extensive variation of form, and that there is a wide range of opportunity for testing the relative skill of bicycle-riders by variations in the arrangement of the circuit-changers. The indicators may be located in a frame attached to the platform or not, as desired, the only requirement of my invention in that respect being that the circuit-changers shall be caused in some way to indicate that they have been operated.

If desired, the whole apparatus may be mechanical rather than calling in the aid of electricity. In that case the circuit-changers would be replaced by suitable mechanical contrivances adapted to be operated by the passage of a wheel over them, and mechanically connected, as by cords or lever systems, with indicating devices of any mechanical character. I would therefore have it understood that I do not limit myself to the exact construction herein shown and described, but hold myself at liberty to make such changes and alterations as fairly fall within the spirit and scope of my invention.

Having fully described my invention, what I claim as new, and desire to secure by Letters Patent, is—

1. The combination with a platform, of a series of circuit-changers arranged therein in position to be operated by the passage of a bicycle-wheel over them, an indicator, and connection between the said changers and indicator, whereby their operation by a wheel is evidenced, substantially as described.

2. In a trick-platform for bicycle-riders, the combination with a plurality of circuit-changers located in the platform so as to be operated by a bicycle ridden over it, a visual indicator and a bell, and electric connections between the said indicator and bell and the circuit-changers, whereby the operation of the latter causes the operation of the former, substantially as set forth.

In testimony whereof I have signed this specification in the presence of two subscribing witnesses.

CHARLES M. PECK.

Witnesses:
FRED. C. EARLE,
J. H. SHUMWAY.